July 3, 1951 — B. J. DALTON — 2,559,346
REGENERATIVE BRAKING CONTROL SYSTEM
Filed March 29, 1949 — 2 Sheets-Sheet 1
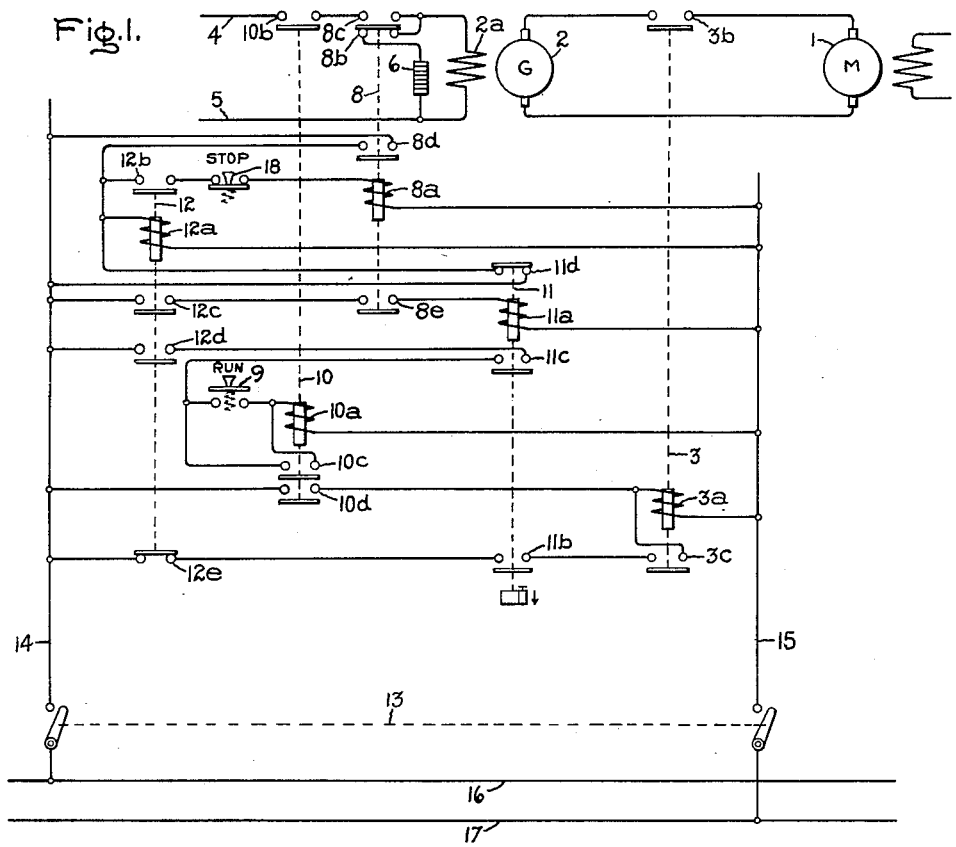
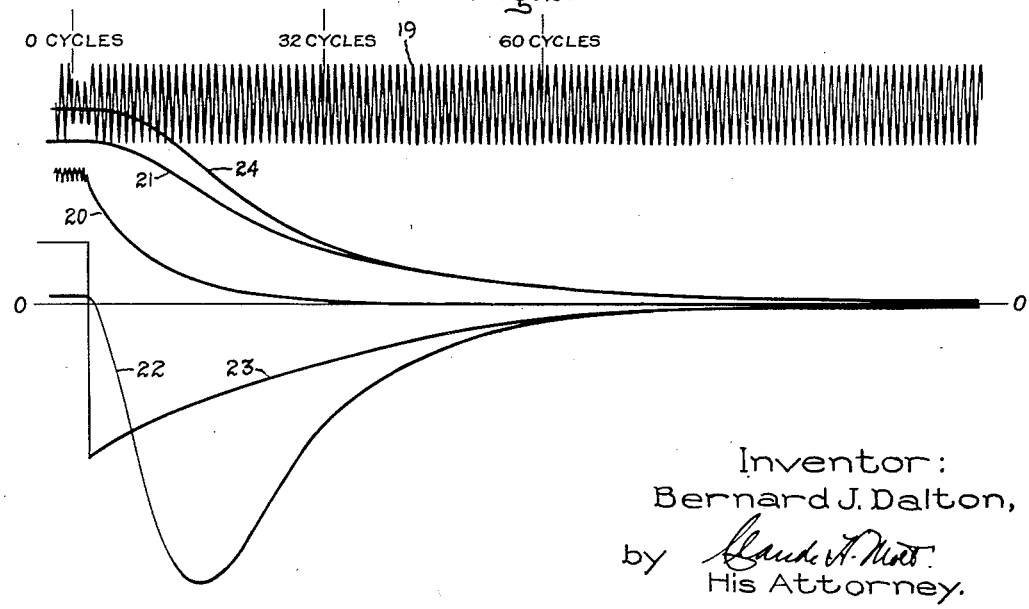
Inventor:
Bernard J. Dalton,
by Claude A. Mott
His Attorney.

July 3, 1951  B. J. DALTON  2,559,346
REGENERATIVE BRAKING CONTROL SYSTEM
Filed March 29, 1949  2 Sheets-Sheet 2
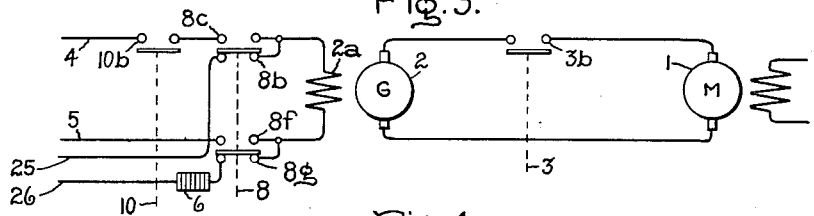
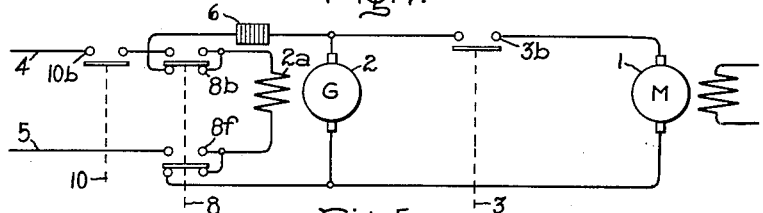
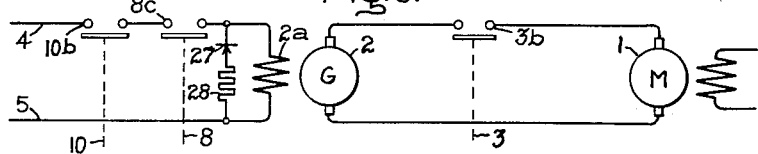
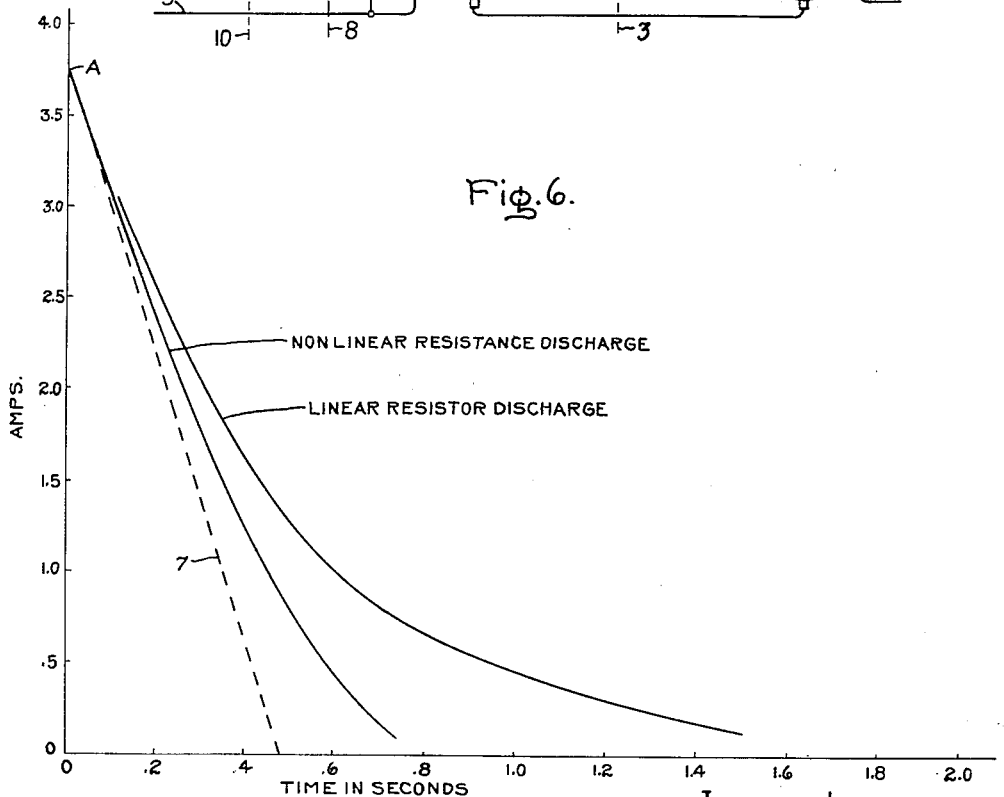
Inventor:
Bernard J. Dalton,
by Claude A. Mott.
His Attorney.

Patented July 3, 1951

2,559,346

UNITED STATES PATENT OFFICE 2,559,346

REGENERATIVE BRAKING CONTROL SYSTEM

Bernard J. Dalton, Scotia, N. Y., assignor to General Electric Company, a corporation of New York Application March 29, 1949, Serial No. 84,233

4 Claims. (Cl. 318—161)

This invention relates to control systems, more particularly to systems for controlling the braking of an electric motor, and it has for an object the provision of a simple, reliable, inexpensive and improved system of this character.

Still more specifically, the invention relates to systems for controlling the regenerative braking of an electric motor which is supplied from an adjustable voltage generator, and a more specific object of the invention is the provision of a system for controlling the rate of decay of field current of the generator to produce the maximum amount of regenerative braking of the motor that is consistent with the commutating abilities of the generator and the motor.

A still further object of the invention is the provision of a regenerative braking control system in which the rate of decay of the generator field is controlled by means of a device which is small, compact, inexpensive, reliable in operation and easily installed.

The adjustable speed drive comprising an adjustable voltage D.-C. generator and a D.-C. motor supplied therefrom is widely used for driving industrial machines. Although great skill and ingenuity have been exercised in designing these machines to eliminate unsafe operating conditions, many of them cannot be made foolproof owing to the nature of the operations which must be performed. One such machine is a rubber calender. In the rubber industry calenders are used in processing various types of rubber goods, such as plastic sheeting and similar material. Calender attendants are frequently required manually to feed milled rubber into the nip of a pair of calender rolls in order to secure adhesion to a fabric which is passing through the calender. This operation presents the hazard that the operator may become entangled in the rolls of the calender. Other operations must be performed about calender rolls or near a sheet of fabric passing over idler rolls. All of these operations are hazardous because of the possibility of the operator's hand or arm becoming entangled.

Because of this possibility it is imperative in an emergency that the rolls be stopped in the shortest possible surface travel. Maximum allowable stopping distances are prescribed by national and State codes, as well as by individual rubber manufacturing companies. These codes have been in effect for a considerable period. However, the current trend toward higher operating speeds requires more effective braking in order to insure the stopping of the machine within the prescribed maximum allowable stopping distances. Rubber calenders together with their driving motors possess considerable stored energy which must be dissipated in braking to rest.

Accordingly a further object of the invention is the provision of a regenerative braking control system for adjustable voltage drives which will be effective at current operating speeds to effect stopping of such hazardous machines within prescribed safe distances.

In carrying the invention into effect in one form thereof, a D.-C. motor is supplied from an adjustable voltage D.-C. generator. The motor is adapted to drive a load of considerable inertia, such, for example, as the rubber calender described in the foregoing. The field winding of the generator is supplied from a suitable source of excitation. For the purpose of providing emergency braking there is provided a non-linear resistor which has the characteristic that its resistance rises as the voltage across its terminals decreases, together with an emergency switch and an electromagnetic switch controlled thereby for simultaneously disconnecting the generator field winding from the source of excitation and reconnecting the nonlinear resistor in a closed loop circuit with the field winding.

For a better and more complete understanding of the invention reference should now be had to the following specification and to the accompanying drawing, of which Fig. 1 is a simple diagrammatic sketch of an embodiment of the invention; Fig. 2 is a chart of characteristic curves which facilitate an understanding of the operation of the system of Fig. 1; Figs. 3, 4 and 5 are modifications, and Fig. 6 is a chart of curves which illustrate the discharge characteristic of a field winding circuit in which a nonlinear discharge resistor is included.

Referring now to the drawing, the shaft of a direct current motor 1 is connected to drive a machine possessing substantial inertia, such, for example, as a rubber calender (not shown). The motor 1 is supplied from an adjustable voltage generator 2 with the armature of which the motor armature is connected in a loop circuit. A contactor 3 is provided for interrupting the armature loop circuit when the motor is at standstill.

The generator 2 is provided with a separately excited field winding 2a which is supplied from a suitable source of excitation which is represented by the two supply conductors 4 and 5. This excitation source is preferably an adjustable voltage source such as an exciter or a controlled rectifier.

For the purpose of controlling the regenerative braking of motor 1, a nonlinear resistor 6 is provided to control the rate of decay of current in the generator field winding when the circuit is opened to effect an emergency stop.

The particular nonlinear resistance which it is preferred to use is disclosed in U. S. Patent 1,822,742—K. B. McEachron. This material has the characteristic that its resistance increases instantaneously and in an exponential manner with decreases in the voltage impressed across its terminals or with decreases in the current density. This characteristic is defined by the equation:

(1) $$V = R_t I^b$$

in which V is the voltage drop across the resistor and I is the current which it conducts. $R_t$ and $b$ are constants for the resistor, the numerical values of which depend on the particular grade of the resistor which is used. The constants vary with variations in ratio of the components of the resistor and with modifications in the process of manufacture, as described in the McEachron patent. For one grade of this resistor material which has been found to give very satisfactory operation $R_t = 250$ and $b = .252$.

To illustrate the rapid increase in resistance with decreases in the impressed voltage, Equation 1 may be rewritten in the form:

(2) $$I = \left(\frac{V}{R_t}\right)^{\frac{1}{b}}$$

and substituting 250 for $R_t$ and .252 for $b$ and assuming $V = 100$ volts, the value of I is found to be .027 ampere. If V is reduced to 50 volts, I is found to be .0017 ampere. It will be noted that by decreasing the voltage by one-half, the current is decreased to one-sixteenth its original value. In other words, reducing the impressed voltage by one-half results in a sixteen fold increase in the ohmic resistance.

The maximum rate at which a D.-C. motor may be decelerated is determined largely by the maximum armature current which it can commutate. This is usually within the range of 150 per cent to 250 per cent of rated current.

Referring to Fig. 6, the dotted curve 7 represents the slope or initial rate of discharge of generator field at point A, which is the point of the beginning of this discharge, or the point of zero time. This is the same as saying that line 7 also represents, proportionately, the initial rate of decay of generator voltage. It also follows that this initial rate represents the greatest rate of discharge and the maximum regenerative current in the armature circuit which occurs throughout the discharge cycle.

In selecting the nonlinear resistor to be used in a particular application, and thus to determine the initial discharge rate described in the foregoing, it is necessary to consider the combined inertia of the motor and driven load and to establish the maximum braking torque, i. e. armature current which is permissible during the regenerative braking cycle.

The initial resistance of the nonlinear resistor which will produce the maximum permissible initial rate of discharge and the maximum permissible regenerative braking current is determined by the equation:

(3) $$R_{nl} = \frac{308 T L}{W K^2 \times RPM} - R_{\text{field}}$$

in which $R_{nl}$ = resistance of nonlinear resistor at instant of beginning of discharge,
T = maximum permissible braking torque, in ft. lbs.
L = inductance of generator field winding in henries,
$WK^2$ = radius of gyration of motor and load in lb. ft.$^2$,
RPM = R. P. M. of motor.

The value of deceleration and thus the decay of countervoltage of the motor produced by the established braking torque on the system inertia should correspond to the rate of discharge established in Fig. 6 for the generator voltage. The reason for this is apparent in that if the generator voltage decays faster than the countervoltage of the motor, the limits of armature current will be exceeded. On the other hand, if the generator voltage decays more slowly than the countervoltage of the motor is able to decay, advantage is not being taken of the most effective braking cycle.

One terminal of the nonlinear resistor 6 is directly connected to one terminal of the field winding 2a and the other terminal of the resistor is connected through the normally closed contacts 8b of an electromagnetic contactor 8 to the other terminal of the field winding 2a. The contactor 8 is also provided with normally open contacts 8c for disconnecting the field winding from the excitation source.

A starting switch, which is illustrated as a push-button type switch 9, is provided for initiating the starting operation. It controls the energization of an electromagnetic relay 10, which in turn completes the field circuit of the generator and controls the loop circuit contactor 3.

A time delay relay 11 of suitable construction is provided with normally open time opening contacts 11b for deenergizing and opening the loop circuit contactor 3, a predetermined interval of time after initiation of the braking cycle. It is also provided with normally open time opening contacts 11c and normally closed time closing contacts 11d for controlling the sequencing operations of the control. An emergency switch relay 12 having normally open contacts 12b, 12c and 12d and normally closed contacts 12e assists in the sequencing of the control operations.

With the foregoing understanding of the elements and their organization, the operation of the system will readily be understood from the following detailed description.

The switch 13 is closed to connect the control voltage busses 14 and 15 to a source of control voltage such as represented by the two supply conductors 16 and 17.

The energizing circuit for the operating coil 12a of relay 12 is completed through the normally closed contacts 11d of the time delay relay. Responsively to energization, relay 12 closes its normally open contacts 12b, 12c and 12d and opens its normally closed contacts 12e. Contacts 12b in closing complete an energizing circuit for the operating coil 8a of the field contactor 8 through the normally closed contacts 11d of the time delay relay and the normally closed contacts of the emergency stop switch 18.

In response to energization the field contactor picks up and closes its normally open contacts 8c to prepare the field circuit of the generator for completion and opens its normally closed contacts 8b to disconnect the discharge resistor from the generator field winding. Simultaneously it closes its normally open contacts 8d to short-circuit the contacts 11d and also closes its normally open contacts 8e to complete an energizing circuit for the operating coil 11a of the time delay relay. In responding to energization the time delay relay opens its normally closed contacts 11d and closes its normally open contacts 11b and 11c without time delay. Contacts 11c in closing prepare the energizing circuit of the run relay 10 for closing.

To initiate acceleration of the motor from rest, the run button 9 is depressed to complete the energizing circuit for the operating coil 10a of the run relay 10. Responsively to energization relay 10 picks up and closes its contacts 10b, 10c and 10d. Contacts 10b in closing complete the connection of the field winding to the excitation source, and contacts 10d in closing complete an energizing circuit for the operating coil 3a of the contactor 3 which picks up and closes its contacts 3b to complete the loop circuit for the armatures of the generator 2 and motor 1. Contacts 10c, in closing, short-circuit the contacts of the run switch 9 which now may be released. The motor 1 is brought up to speed by increasing the voltage of the excitation source 4, 5 or by means of a rheostat (not shown) if it is a constant voltage source.

In the event of an emergency requiring that the motor be stopped in the shortest possible time, the emergency stop switch 18 is depressed to interrupt the energizing circuit for the operating coil of the field contactor 8 which drops out and opens its contacts 8c to disconnect the generator field winding 2a from the excitation source and simultaneously closes its contacts 8b to connect the field winding 2a in a closed loop circuit with the nonlinear discharge resistor 6. Simultaneously it opens its contacts 8d to interrupt the energizing circuit for the operating coil 12a of the relay 12 and also opens its contacts 8e to deenergize the timing relay 11 and thereby to initiate its timing operation.

Responsively to deenergization, the emergency stop relay opens its contacts 12b, 12c and 12d, and closes its normally open contacts 12e. Contacts 12e in closing complete a short circuit around the contacts 10d of the run relay 10. Contacts 12d in opening deenergize the run relay 10 which drops out and opens its contacts 10b, 10c and 10d. After the contacts 10d open, the loop circuit contactor 3 remains locked in through contacts 12e, 11b and 3c.

The braking operation is illustrated graphically by the curves in Fig. 2 which are taken from an oscillograph record made during the braking period of an actual installation. In Fig. 2 the sinusoidal curve 19 is a 60 cycle timing wave and the curve 20 represents the generator field current. The armature voltage of the generator is represented by the curve 21 and the armature circuit regenerative braking current is represented by the curve 22. The curve 23 represents the generator field voltage and the curve 24 represents the motor speed.

Within 32 cycles of the operation of the emergency stopping switch the resistance of the field discharge resistor 6 has increased over twenty times. It is seen from the curves that the field current decreases to 33% (the time constant value) of its initial value in approximately 12 cycles after operation of the emergency switch and to ⅓ of the time constant value, e. g. $1/9$ of the initial value within 22 cycles after operation of the emergency switch. Curve 24 illustrates that within 1.4 seconds of operation of the emergency switch the motor speed was reduced from 1150 R. P. M. to 52.4 R. P. M. and that the total revolutions at the end of 1.4 seconds was 9.12 which in the actual installation corresponded to 28.5 inches of peripheral rotation of the calender rolls. From these curves it may be determined that the motor was completely stopped after 9.9 revolutions or 31" of roll travel.

After a predetermined interval of time, which is greater than the time required to stop the motor, the time delay relay drops out and opens its normally closed contacts 11b to interrupt the locking circuit for the contactor 3 which drops out and opens its contacts 3b to interrupt the armature loop circuit and also opens its contacts 3c. Simultaneously, the time delay relay opens its contacts 11c and closes its contacts 11d, thereby to reenergize the emergency stop relay 12 which picks up and closes its contacts 12b, 12c and 12d and opens its contacts 12e, thereby leaving the circuit in a reset condition.

In the modification of Fig. 3, the field contactor 8 is provided with an additional normally open contact 8f and an additional normally closed contact 8g. One terminal of the generator field winding is connected through normally closed contact 8b to one side of a source of low voltage excitation which is represented by the supply conductors 25 and 26, and the opposite terminal of the generator field winding is connected through the normally closed contacts 8g and the nonlinear discharge resistor 6 to the opposite side of the low voltage excitation source. The remainder of the control system is identical with the system of Fig. 1. The operation is also identical with the exception that when the field contactor 8 is dropped out in response to operation of the emergency switch the generator field winding is connected in circuit with the nonlinear resistor 6 to the low voltage source 25 and 26 for reverse energization. This provides approximately the same braking characteristic as that of the control system of Fig. 1 and will also provide a small reverse current during standby to minimize residual voltage of the generator.

In the modification of Fig. 4, when the field contactor is deenergized and dropped out, the upper or positive terminal of the generator field winding is connected through the normally closed contact 8b and the nonlinear resistor 6 to the negative armature terminal of the generator and the negative terminal of the field winding is connected through normally closed contacts 8g to the positive terminal of the generator. The braking characteristic will be approximately the same as that of the system of Fig. 1.

The modification of Fig. 5 is the same as that of Fig. 1 with the exception that the preferred form of nonlinear resistor 6 is replaced by a dry disk rectifier 27 in series with a fixed resistor 28 which may be either a selenium rectifying unit or a copper oxide rectifier unit. Selenium and copper oxide rectifier units have a nonlinear resistance characteristic such that a decrease in the impressed voltage results in an increase in resistance. They also have the advantage that they have unidirectional conduction and consequently may be permanently connected across the generator field winding. The rectifier is poled to be nonconducting when the generator field winding is connected to the excitation source. When the field contactor is dropped out and the field winding is disconnected from the excitation source, its voltage reverses and the rectifier conducts. By selecting the correct values of resistance in the manner described in connection with nonlinear resistor 6, the characteristic of the system of Fig. 1 can be very closely approximated.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination an adjustable voltage generator provided with a separately excited field winding, a source of excitation for said field winding, an electric motor having its armature connected in a series loop circuit with the armature of said generator, said motor armature having substantial inertia and being adapted to be coupled to a load of substantial inertia, and emergency braking means comprising a nonlinear resistor having a resistance characteristic which rises as the voltage impressed across its terminals decreases, an emergency control switch and a switching device responsive to operation of said emergency switch for connecting said nonlinear resistance across the terminals of said field winding and a second switching device responsive to operation of said emergency switch for disconnecting said field winding from said source of excitation.

2. A control system comprising in combination an adjustable voltage generator provided with a separately excited field winding, a source of excitation for said field winding, an electric motor having its armature connected in a series loop circuit with the armature of said generator, said motor armature having substantial inertia and being adapted to be coupled to a load of substantial inertia, and emergency regenerative braking control means comprising a nonlinear resistor having the characteristic that its resistance varies according to an exponential function of the current which it conducts, an emergency switch, and an electromagnetic contactor responsive to operation of said emergency switch for disconnecting said field winding from said source and for connecting said nonlinear resistor in a loop circuit with said field winding thereby to produce a rate of decay of generator field current which is substantially greater than the rate of decay of generator field voltage.

3. A control system comprising in combination an adjustable voltage generator provided with a separately excited field winding, a source of excitation for said field winding, an electric motor having its armature connected in a series loop circuit with the armature of said generator, said motor armature having substantial inertia and being adapted to be coupled to a load of substantial inertia, and emergency regenerative braking control means comprising a nonlinear resistor having the characteristic that its resistance varies inversely with the impressed voltage and according to an exponential function of the current which it conducts, an emergency control switch, and an electromagnetic contactor responsive to operation of said emergency switch for connecting said nonlinear resistor in a loop circuit with said generator field winding and substantially simultaneously disconnecting said field winding from said source of excitation to produce a rate of decay of generator field current that is substantially greater than the rate of decay of generator field voltage, thereby to maximize the regenerative braking torque of said motor.

4. A control system comprising in combination an adjustable voltage generator provided with a separately excited field winding, a source of excitation for said field winding, an electric motor having its armature connected in a series loop circuit with the armature of said generator, said motor armature having substantial inertia and being adapted to be coupled to a load of substantial inertia, and emergency regenerative braking control means comprising a nonlinear resistor having the characteristic that its resistance varies inversely with the impressed voltage and according to an exponential function of the current which it conducts, an electromagnetic contactor having a pair of normally open contacts between said field winding and said source of excitation and a pair of normally closed contacts between said resistor and field winding, a starting switch and means controlled thereby for energizing said contactor to close said normally open contacts to connect said field winding to said source and for opening said normally closed contacts to disconnect said nonlinear resistor from said field winding and from said source, an emergency stopping switch in the coil circuit of said contactor for deenergizing said contactor to disconnect said field winding from said source and substantially simultaneously to connect said resistor in a loop circuit with said field winding to produce a rate of decay of generator field current that is substantially greater than the rate of decay of generator field voltage, thereby to maximize the regenerative braking torque of said motor.

BERNARD J. DALTON.

REFERENCES CITED

The following references are of record in the file of this patent:

UNITED STATES PATENTS

| Number | Name | Date |
|---|---|---|
| 1,961,940 | O'Hagan | June 5, 1934 |
| 2,298,188 | Wright | Oct. 6, 1942 |